Sept. 29, 1970     C. G. KELSEY     3,530,589

DRAUGHTING MACHINE

Filed Oct. 5, 1966     2 Sheets-Sheet 1

CHRISTOPHER G. KELSEY
INVENTOR.

BY

ATTORNEYS

United States Patent Office 3,530,589
Patented Sept. 29, 1970

3,530,589
DRAUGHTING MACHINE
Christopher G. Kelsey, Glenalta, South Australia, Australia, assignor to Data Resolved Tools Pty. Ltd., Plympton, South Australia, Australia
Filed Oct. 5, 1966, Ser. No. 584,507
Claims priority, application Australia, Oct. 5, 1965, 64,809/65
Int. Cl. B43l 13/00
U.S. Cl. 33—23
8 Claims

ABSTRACT OF THE DISCLOSURE

A draughting machine for interchange of data from one set of orthographic drawings to another, or alternatively from a set of orthographic drawings to a three dimensional object, or alternatively from a three dimensional object to a set of drawings, wherein tracer means and print-out means are coupled to move together for translational displacement in an X direction, but are interconnected by rotational members for differential movement in the Y and Z directions.

---

Figure 1:
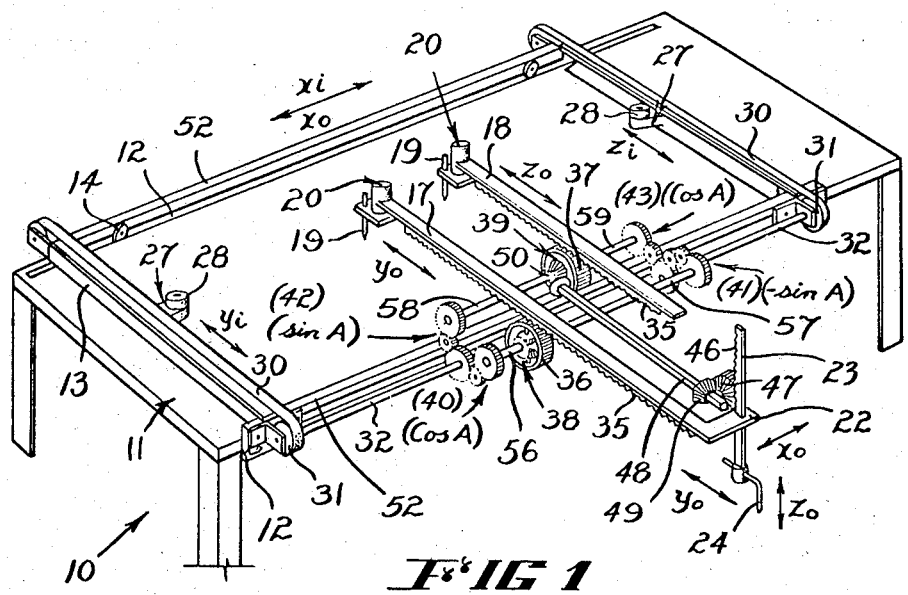

This invention relates to a draughting machine which can be used for interchange of data from an input form to an output from, for example from a drawing to a solid object such as a model or a template.

Previous inventions of ours included draughting machines wherein information was obtained from orthographic projections and the views were "tipped" by utilizing a series of link arms, and wherein data was obtained alternatively by tracing lines of orthographic projections or running a tracer over a model and converting the information obtained into electrical signals.

This invention relates to a mechanical draughting machine wherein data is transferred from an input form to an output form by simple mechanical means, either from one or more orthographic views of the drawing or from a model or template.

This invention may be said to consist of a draughting machine capable of interchange of data from an input form to an output form, comprising a table, parallel longitudinal guide means fixed relative to the table, a carriage, track engaging means on the carriage engaging the longitudinal guide means and guiding the carriage for longitudinal movement along the tracks, transverse guide means on the carriage arranged at right angles to the longitudinal guide means, a pair of members carried by the carriage and guided for movement by the transverse guide means in a direction at right angles to the longitudinal guide means, tracer or print-out means on the transversely movable members, motion conversion means coupled to one of the transversely movable members converting translational movement thereof to rotational movement, and rotational drive transmission means coupled to the motion conversion means interconnecting the tracer means of one said form to the print-out means of the other said form.

The pantograph arrangement employed in our previous inventions has proved to be satisfactory and practical, but utilizing pantograph arms requires some knowledge and understanding of the mathematical principles involved which may not necessarily be possessed by all potential users of a machine, and this invention, by including the feature of converting translational movement to rotational movement, provides a simple means whereby the data may be interchanged from a three dimensional model to a drawing (or vice versa), and furthermore the rotational movement may be resolved to a fraction thereof and the resolved rotational movement added algebraically through intermeshing gears. The intermeshing gears can for example be constituted by a differential gear assembly. The combination of these two features into a single machine is made possible by the introduction of rotational movement.

Figure 2:
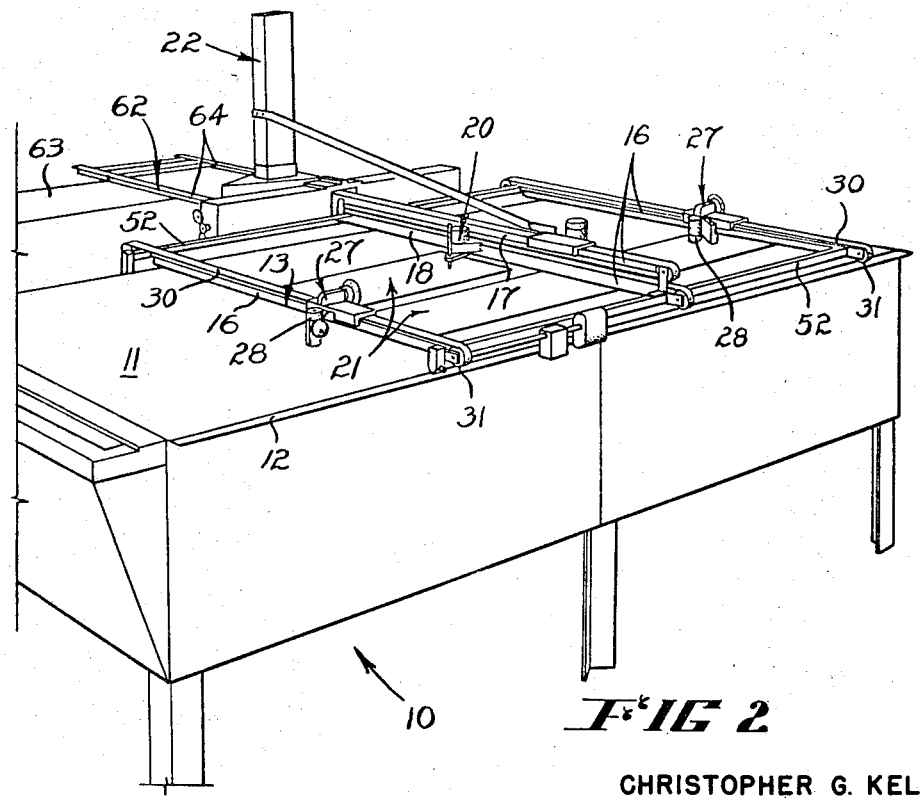
Figure 3:
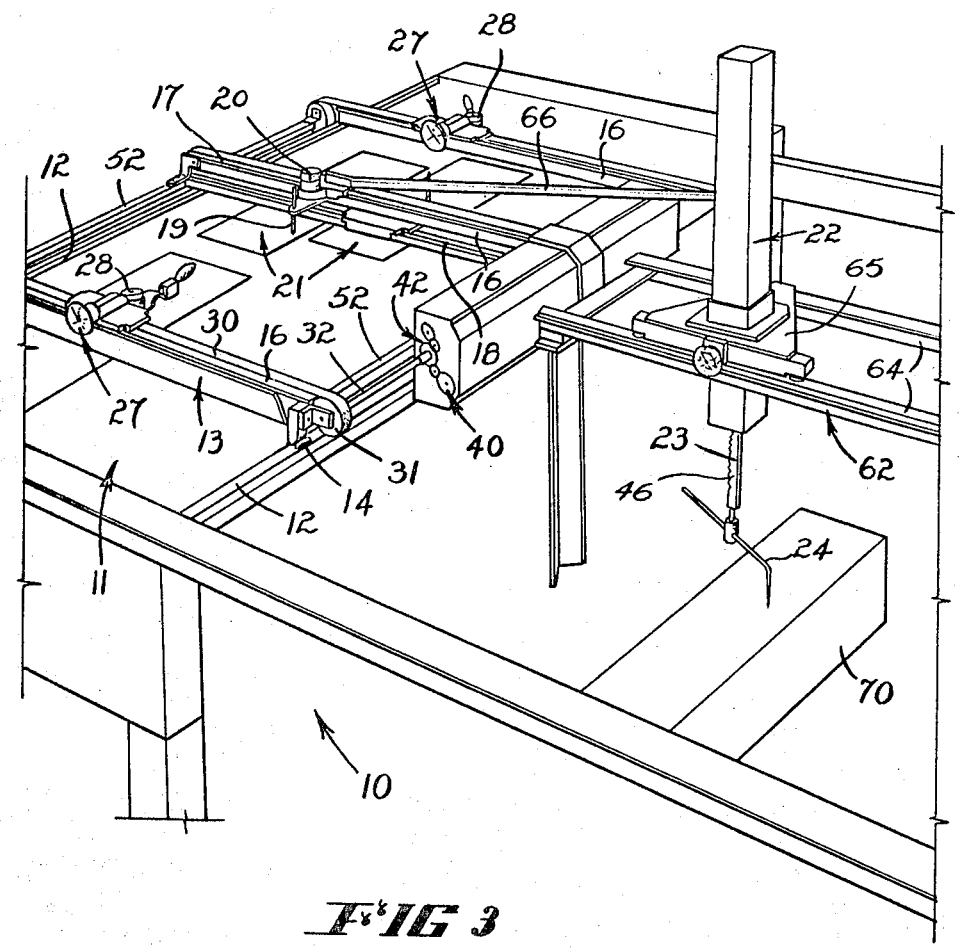

An embodiment of the invention is described hereunder in some detail with reference to and is illustrated in the accompanying drawings, in which:

FIG. 1 is a diagrammatic representation of the mechanical elements of a machine capable of interchanging data from one set of orthographic drawings to an auxiliary set wherein the Cartesian co-ordinates are rotated, or from a set of drawings to a model, or either of the above interchange functions in reverse, FIG. 2 is a front elevation of the machine, and FIG. 3 is a rear view of the machine, showing model, drawings and templates in position.

Referring first to FIG. 1, a draughting machine 10 capable of interchange of data from an input form to an output form comprises a table 11, longitudinal tracks 12 constituting longitudinal guide means secured to the table 11 along opposite edges thereof, and a carriage 13 carried on track engaging wheels 14 engaging the tracks 12. The transverse guide means 16 are not shown in FIG. 1 but are illustrated in FIGS. 2 and 3, and are constituted by tracks which form the transverse members of the carriage 13. Referring back to FIG. 1, however, a pair of transversely movable members 17 and 18 are movable relative to the carriage 13 in a direction exactly at right angles to the direction of movement of the carriage 13, and these carry print-out means 19 which may for example be a pen, pencil or the like for draughting if paper is fixed to the table 11, but in this embodiment is constituted by a sharp pointed member having an electric potential applied thereto, and attached to a clapper on an electromagnet 20, the member being effective in marking metal. (For the purposes of this specification, marking metal is also regarded as "draughting.") FIGS. 2 and 3 show template blanks 21 for marking purposes. The member 17 also carries at its outer end vertical guide means 22 which guides for vertical movement a slide 23 carrying a tracer probe 24.

The ends of the longitudinal carriage 13 have thereon two of the guide means 16 (not shown in FIG. 1), and these guide input tracer heads 27 having tracer microscopes 28 thereon. In use, these microscopes are aligned over corresponding drawn lines of separate views (say elevation and plan) of a product, and are moved independently in a transverse direction (usually by two operators) while the carriage 13 moves in a longitudinal direction, retaining the microscopes at constant spacing and therefore scanning corresponding points of the lines. That is, for any given X co-ordinate, one of the microscopes will be positioned over a point having a corresponding Y co-ordinate, and the other over a point having a corresponding Z co-ordinate.

The tracer heads 27 are on flexible steel bands 30 which drive respective drums 31 on rotational input shafts 32. The members 17 and 18 have rack teeth 35 thereon which engage pinions 36 and 37 respectively, but these pinions are on the driven portions of differential gear assemblies 38 and 39 respectively, driven by the input shafts 32 through the four sets of revolving gears designated 40 (cos $a$), 41 (−sin A), 42 (sin A) and 43 (cos A). FIG. 1 illustrates a physical arrangement for the gears 41 (−sin A) and 43 (cos A), and it will be seen that the negative value is achieved by reversal of direction. The purpose of the trigonometrical resolution is to achieve rotation of axes and is described below.

The vertical slide 23 also has on its rack teeth 46 which drive a pinion 47, and this in turn drives an output shaft 48 (obscured in FIG. 3) through bevel gears 49, the output shaft 48 being coupled to the driven member of the differential gear assembly 39 through further bevel gears 50, so that vertical movement of the slide 23 is exactly duplicated by horizontal movement of the transversely movable member 18. FIG. 1 illustrates reference to Cartesian co-ordinates by the symbols $x_1$, $y_1$, and $z_1$ for input; $X_o$, $Y_o$ and $Z_o$ for output. These functions may be reversed.

It might be noted that only the slide 23 need employ motion conversion means to drive the transversely movable member 18 if no rotation of axes is required, since movement of the printout means 20 exactly follows movement of the probe 24 for $x$ and $y$ direction displacements.

The machine illustrated in FIGS. 2 and 3 employs exactly the arrangement shown in FIG. 1 diagrammatically, and this machine is described hereunder in a little more detail, employing the designation numbers used with reference to FIG. 1 where applicable.

A draughting table 11 is provided with longitudinal tracks 12 along each longitudinal edge and a carriage 13 is supported on wheels 14 which engage these tracks 12. The tracks 12 in this embodiment are of inverted V-shape and to achieve low friction the wheels are constituted by small ball races.

The carriage 13 has two longitudinal members 52 and three transverse members which form the transverse guide means 16, the two outer transverse members also having on them the input heads 27 which are again supported by rollers or wheels (not shown) for transverse movement, and each of these outer sub-carriages has thereon a microscope 28 provided with cross-hairs (and if desired a prism) to enable a line to be traced accurately. Resolvers which in this embodiment are formed by the gears 40, 41, 42 and 43 are mounted on the carriage 13 and coupled to respective input shafts 32 which are rotationally driven by means of respective flexible metal bands 30 extending around drums 31 on the shafts 32, the ends of the bands being secured to the transversely movable input heads 27 in each case, so that as a head moves transversely its translational motion is converted to rotational motion on the input shafts of the resolvers.

The resolver is constituted by a gear train (respectively 40, 41, 42 and 43) the gear train consists of a series of gears of differing diameters, one set for each angle of rotation, and an idler gear (or two idler gears for a negative function) is arranged to be moved radially away from a pair of intermeshing gears and moves axially to a new position.

The output shafts (respectively 56, 57, 58 and 59) of the resolvers extend parallel and adjacent to the respective longitudinal tracks of the table and terminate at their inner ends in input shafts of the differential gearboxes 38 and 39. These shafts are obscured from view in FIGS. 2 and 3 but are illustrated in FIG. 1. In order to avoid problems due to back-lash, the differential gearboxes utilize spur gears with accurately cut teeth, and the driven member of each differential gearbox has on it gear teeth which mesh with respective rack teeth 35 on the transversely movable (output) members 17 and 18 respectively which are transversely movable along the centre transverse member 16 of the main carriage 13.

The two output members are thus independently driven along their adjacent guides, and each output member has on it a small electromagnet 20 with a clapper type of armature having an extension, the extension containing a read-out sharp pointed member 19, and the electromagnets are energized or de-energized by control of a push-button located near the microscopes. The member 19 is provided with a potential so that it will make a spark mark on a template.

The arrangement is such that if the resolvers adjacent one longitudinal track are set to the sine and cosine of an angle of tip and at the other longitudinal track the cosine and −sine respectively, the differential gearboxes will algebraically add the outputs so that the output drawings conform with the formulae ($\pm y_1 \cos A \mp x_1 \sin A$) and $\mp Y_1 \sin A \pm X_1 \cos A$) respectively, and this will then give a plan and elevation redrawn in its reoriented position about Cartesian co-ordinates which have been rotated.

Since the plan and elevation are thus redrawn simultaneously, it will be seen that the X, Y and Z co-ordinates of a point in space are fixed simultaneously by means of this machine. The main longitudinal carriage 13 has a centrally mounted outrigger 62 extending rearwardly and supported at its outer end on rollers engaging a further track 63 which is parallel to the longitudinal tracks 12. This outrigger 62 again includes transverse tracks 64 which are engaged by a sub-carriage 65 direct coupled to the read-out transversely movable member 17 referred to above by the arm 66, while the other member 18 referred to above drives through the square output shaft 48 (see FIG. 1) to a rack and pinion on the member 18 on the outrigger (see description of FIG. 1). Thus the transversely movable member 17 is moved inwardly and outwardly, say in the direction of the Y co-ordinate; it is moved longitudinally say in the direction of the X co-ordinate, and the vertically movable slide 23 is controlled by the rack and pinion to thereby provide the Z co-ordinate output. Thus a hot wire attached to the vertically movable slide (in lieu of the probe 24) on the outrigger will be capable of cutting, for example, a block of polystyrene and establishing a witness line in conformity with the three dimensions determined by the two views of a drawing which are being traced by the microscope, the witness line being rotated if necessary.

By utilizing a simple electromechanical or hydromechanical force amplifier, the three dimensional cut can be made with a cutting tool, for example a routing head. The amplifier can be any one of a large number of forms, and can be driven for example by servomotors, by electric motors controlled with microswitches or capacitor or inductor sensitive members through electronic amplifiers, or by means of hydraulic tracing heads coupled to hydraulic rams. In some instances of course it is not necessary to have an amplifier for routing, and soft materials such as plaster of paris can be routed with a routing head coupled to the vertically slidable member, the movement of the routing head being controlled by hand as the microscopes are moved to cross two views of a drawing.

There are occasions when it is desirable to work back from a model to form a drawing, and this can be achieved in this invention by simply running the probe 24 over a model (designated 70 in FIG. 3), the up and down movement driving one read-out member (18) in a Z direction while the transverse movement drives the other read-out member (17) in the Y direction, this being achieved during movement of the outrigger in an X direction. In this instance the probe 24 replaces the tracer heads 27 as input means, a distinction lying however in that the tracer heads 27 are always utilized for input signals, while the slide 23 need not necessarily carry an input probe 24, but can, as said, carry a tool for cutting, and thus constitute output means when the tracer heads 27 are utilized as input means.

Similarly the device may be used for checking a model against drawings or vice versa in a similar manner.

There are occasions when it is desirable to plot cross sections from information contained on two orthogonal views, and this can be achieved by utilizing a moving table. The third view for example can be achieved by simply attaching a horizontal pencil to the vertically movable portion of the sub-carriage on the outrigger and moving this pencil across a vertically positioned board disposed transversely of the longitudinal tracks, and this will then give the third (Y–Z) view.

If it is desired to use the machine for making a pattern (for example from foam polystyrene) this can be readily achieved by any one of a number of techniques. Possibly the simplest of the available techniques is to firstly reproduce the drawing to an enlarged scale with a pantograph or by hand, and then cut the pattern as if it were a model from the enlarged drawing.

Tests undertaken with a machine constructed according to this invention have indicated that the machine is very simple to use and achieves a much greater accuracy than can be achieved by previously employed hand methods.

What I claim is:

1. A draughting machine capable of interchange of data from an input form to an output form, comprising a table, parallel longitudinal guide means fixed relative to the table, a carriage, guide engaging means on the carriage engaging the longitudinal guide means and guiding the carriage for longitudinal translational movement relative to the table, transverse guide means on the carriage arranged at right angles to the longitudinal guide means, a pair of transversely movable members, guide engaging means on the transversely movable members engaging complementary said transverse guide means and guiding the transversely movable members for independent transverse translational movement relative to the carriage, print-out means on each of the transversely movable members, motion conversion means carried by the carriage and converting the transverse translational movements of one of the transversely movable members to rotational movement, vertical guide means fixed relative to the other transversely movable member, a vertical slide guided for vertical movement by the guide means, a tracer probe on the vertical slide, a rack on the vertical slide, a pinion meshing with the rack, and rotational drive transmission means coupling the pinion and the motion conversion means, whereby interconnecting the tracer probe to the print-out means.

2. A draughting machine according to claim 1 wherein the motion conversion means is constituted by a rack on a said transversely movable member engaging a pinion, and further including a rack fixed relative to the slide engaging a second pinion, and an output shaft having bevelled gears at its ends interconnecting the two pinions for drive whereby vertical movement of the slide causes corresponding horizontal movement of the transversely movable member.

3. A draughting machine capable of interchange of data from an input form to an output form, comprising a table, parallel longitudinal guide means fixed relative to the table, a carriage, guide engaging means on the carriage engaging the longitudinal guide means and guiding the carriage for longitudinal translational movement relative to the table, transverse guide means on the carriage arranged at right angles to the longitudinal guide means, two pairs of transversely movable members, guide engaging means on the transversely movable members engaging complementary said transverse guide means and guiding the transversely movable members for independent transverse translational movement relative to the carriage, print-out means on each of the transversely movable members of one of the pairs tracer means on each of the transversely movable members of the other pair, motion conversion means carried by the carriage and converting each said transverse translational movement to rotational movement, resolving means resolving the rotational movement to a fraction thereof, and addition means adding the resolved rotational movement algebraically.

4. A draughting machine according to claim 3 wherein the transverse guide means is constituted by three transverse members interconnecting longitudinal members of the carriage.

5. A draughting machine according to claim 4 wherein the motion conversion means include flexible steel bands and drums and also include racks and pinions.

6. A draughting machine according to claim 5 wherein the transversely movable members carrying said tracer means are coupled to the flexible steel bands and drive input shafts carry the drums, said resolving means being between the input shafts and the addition means, and the addition means being constituted by differential gears.

7. A draughting machine according to claim 6 wherein the resolving means are constituted by gear trains of ratio equal to trigonometrical functions of an angle of rotation of axes.

8. A draughting machine capable of interchange of data from an input form to an output form, comprising a table, parallel longitudinal guide means secured to the table near opposite edges, a carriage, wheels on the carriage engaging the guide means for longitudinal movement of the carriage relative to the table, three transverse members extending across the carriage one pair of transversely movable input members, one pair of transversely movable output members, wheels on the transversely movable members engaging complementary guide means on the transverse members and guiding the transversely movable members for independent transverse translational movement relative to the carriage, input tracer means on the transversely movable members of one pair, print-out means on the transversely movable members of the other pair, motion conversion means converting translational movements of all said transversely movable members to rotational movement, a pair of input shafts directly driven by respective motion conversion means coupled to the transversely movable input members, a pair of output shafts, resolving gears coupling the input shafts and output shafts for drive, differential gears coupling the input output shafts and constituting input means, teeth on the driven members of the differential gears, rack teeth on the output transversely movable members meshing with the teeth on said driven members, a vertical slide movable relative to the first of the output transversely movable members, and a shaft and gear drive between said first transversely movable member and the other said output transversely movable member.

References Cited

UNITED STATES PATENTS 2,442,117  5/1948  Davis.

FOREIGN PATENTS 121,863   7/1943   Australia.
588,314   12/1959  Canada.
878,625   10/1961  Great Britain.

HARRY N. HAROIAN, Primary Examiner

U.S. Cl. X.R.

33—18